United States Patent [19]

Saito et al.

[11] 4,410,972
[45] Oct. 18, 1983

[54] ROTARY RECORDING MEDIUM REPRODUCING APPARATUS HAVING A JACKET OPENING ENLARGING DEVICE

[75] Inventors: Takashi Saito, Ayase; Takashi Kumaki, Sagamihara, both of Japan

[73] Assignee: Victor Company of Japan, Ltd., Yokohama, Japan

[21] Appl. No.: 293,836

[22] Filed: Aug. 18, 1981

[30] Foreign Application Priority Data

Aug. 18, 1980 [JP] Japan .................................. 55-113307

[51] Int. Cl.$^3$ ................................................ G11B 1/00
[52] U.S. Cl. ..................................... 369/77.2; 369/292
[58] Field of Search ................. 369/77, 219, 243, 249, 369/262, 263, 270, 291, 292

[56] References Cited

U.S. PATENT DOCUMENTS

| | | | |
|---|---|---|---|
| 3,873,100 | 3/1975 | Omiya et al. | 369/262 |
| 3,899,181 | 8/1975 | Dannert et al. | 369/291 |
| 4,168,835 | 9/1979 | Omiya et al. | 369/291 |

Primary Examiner—Steven L. Stephan
Attorney, Agent, or Firm—Louis Bernat

[57] ABSTRACT

A recording reproducing apparatus reproduces a rotary recording medium which is accommodated within a jacket. The apparatus has a jacket opening enlarging device which is horizontally movable over a turntable, in the vicinity of a lateral inserting opening. For loading the recording, the jacket is inserted into the rear part of the reproducing apparatus where the record is captured and then the jacket is pulled out, leaving the record on the turntable. The jacket opening enlarging device comprises upper and lower enlarging members aligned with the inserting opening and pivotally coupled together to open and close by swinging upwardly and downwardly respectively. Fingers on the enlarging members project towards the inserting opening, which are close to each other when the jacket opening enlarging device is in the vicinity of the inserting opening. A rotating mechanism swingably opens the upper and lower enlarging members so that the fingers open the jacket engaging with rims as the jacket opening enlarging device moves toward the rear part. An enlarging member locking mechanism interlocks the upper and lower enlarging members for keeping them closed to shut the inserting opening when the jacket opening enlarging device is positioned in the vicinity of the inserting opening, and release the interlock upon insertion of the case.

8 Claims, 7 Drawing Figures

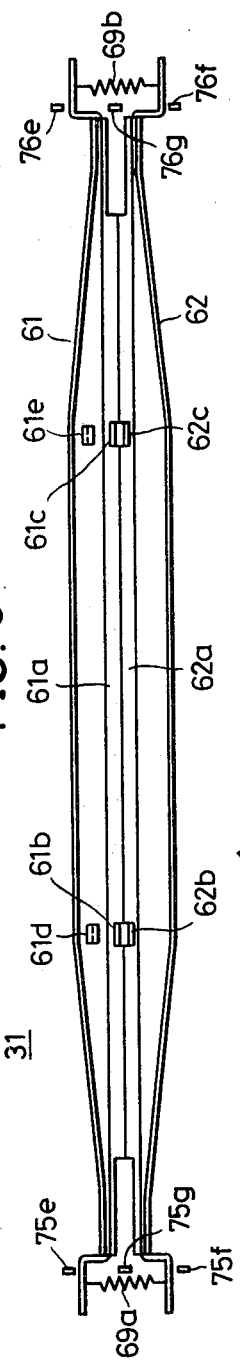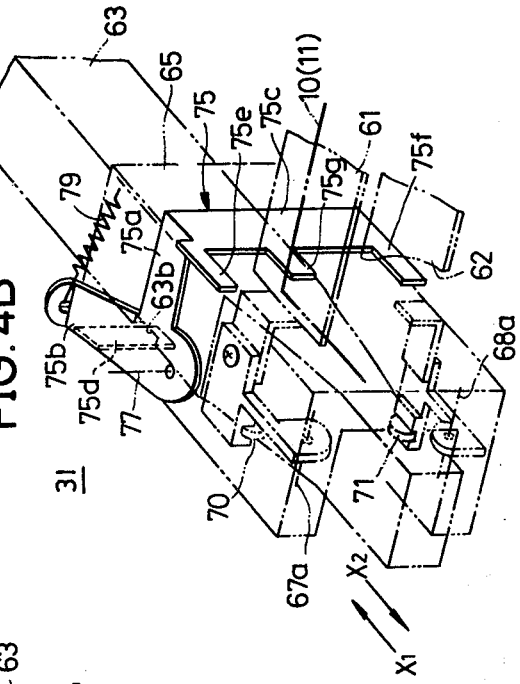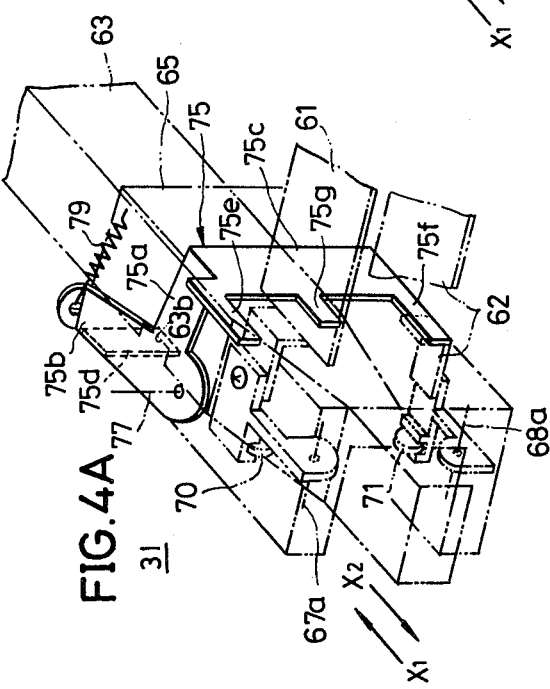

ROTARY RECORDING MEDIUM REPRODUCING APPARATUS HAVING A JACKET OPENING ENLARGING DEVICE

BACKGROUND OF THE INVENTION

The present invention generally relates to rotary recording medium reproducing apparatuses capable of placing and leaving a rotary information recording medium in a state possible for reproduction within the reproducing apparatus when a jacket having a lid for accommodating the recording medium therein is inserted into and then pulled out from within the reproducing apparatus, and also capable of incasing the recording medium within the jacket so that the recording medium can be obtained outside the reproducing apparatus together with the jacket, when the empty jacket is inserted into and then pulled out from within the reproducing apparatus. The present invention more particularly relates to the above type of a rotary recording medium reproducing apparatus provided with a jacket opening enlarging device having a locking mechanism which locks upper and lower enlarging members for enlarging an opening of the jacket which is inserted into the reproducing apparatus, when the rotary recording medium is loaded into and unloaded from the reproducing apparatus.

Conventionally, in an apparatus for reproducing a rotary recording medium (referring to a video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a jacket (disc case) which has a lid and accommodates a disc therein, from within the reproducing apparatus. As a conventional apparatus of this type, a reproducing apparatus was proposed in a U.S. patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an innermost part on the opposite side from the inserting opening with respect to the turntable, a jacket opening enlarging device provided in the vicinity of the inserting opening, capable of moving over the turntable between the position in the vicinity of the inserting opening and the innermost part of the reproducing apparatus, for enlarging the opening of the jacket by entering inside cutouts of the lid member upon insertion of the jacket into the reproducing apparatus through the inserting opening, lowering and raising means for lowering the disc to a position where the disc is placed on the turntable from a holding position where a disc is held by the holding means upon starting of the reproduction, and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

In the above previously proposed reproducing apparatus, the jacket opening enlarging device is constructed on that upper and lower enlarging members are respectively provided in a horizontal manner. Accordingly, when the jacket opening enlarging device is positioned at the case inserting opening side of the reproducing apparatus, the upper and lower enlarging members are respectively rotated towards directions so as to mutually close upon each other.

However, in the previously proposed reproducing apparatus, means and the like for restricting the rotation of the upper and lower enlarging members in the enlarging direction, were not provided. Hence, when an operator inserts a finger and the like inside the case inserting opening, for example, the upper and lower enlarging members are respectively rotated in the enlarging direction, and the finger and the like is inserted into the reproducing apparatus. Especially during a reproducing mode in which the disc is rotating at a high speed together with the turntable, there was a danger in that the finger tip could be injured upon contact with the turntable which is rotating at a high speed when a finger is inserted. Furthermore, there was a disadvantage in that a foreign substance could possibly enter within the reproducing apparatus by respectively rotating the upper and lower enlarging members towards the enlarging direction.

SUMMARY OF THE INVENTION

Accordingly, it is a general object of the present invention to provide a novel and useful rotary recording medium reproducing apparatus having a jacket opening enlarging device, in which the above described problems have been overcome.

Another and more specific object of the present invention is to provide a rotary recording medium reproducing apparatus having a jacket opening enlarging device which is provided with a mechanism for locking enlarging members which operate in enlarging directions to vertically enlarge a jacket opening, in positions before the operated state. According to the apparatus of the present invention, the enlarging members do not unnecessarily perform an enlarging operation. Hence, foreign substances are prevented from entering into the reproducing apparatus, and further, the safety of the apparatus is improved so that finger tips and the like are prevented from being injured.

Other objects and further features of the present invention will be apparent from the following detailed description when read in conjunction with the accompanying drawings.

BRIEF DESCRIPTION OF THE DRAWINGS

FIG. 3 is an elevation showing an embodiment of a jacket opening enlarging device which forms an essential part of the rotary recording medium reproducing apparatus according to the present invention;

FIGS. 4A, 4B, and 4C respectively are diagrams showing operating states of a jacket opening enlarging device, especially with respect to a locking mechanism, before and upon insertion of a disc case (jacket) into the reproducing apparatus.

DETAILED DESCRIPTION

Figure 1:
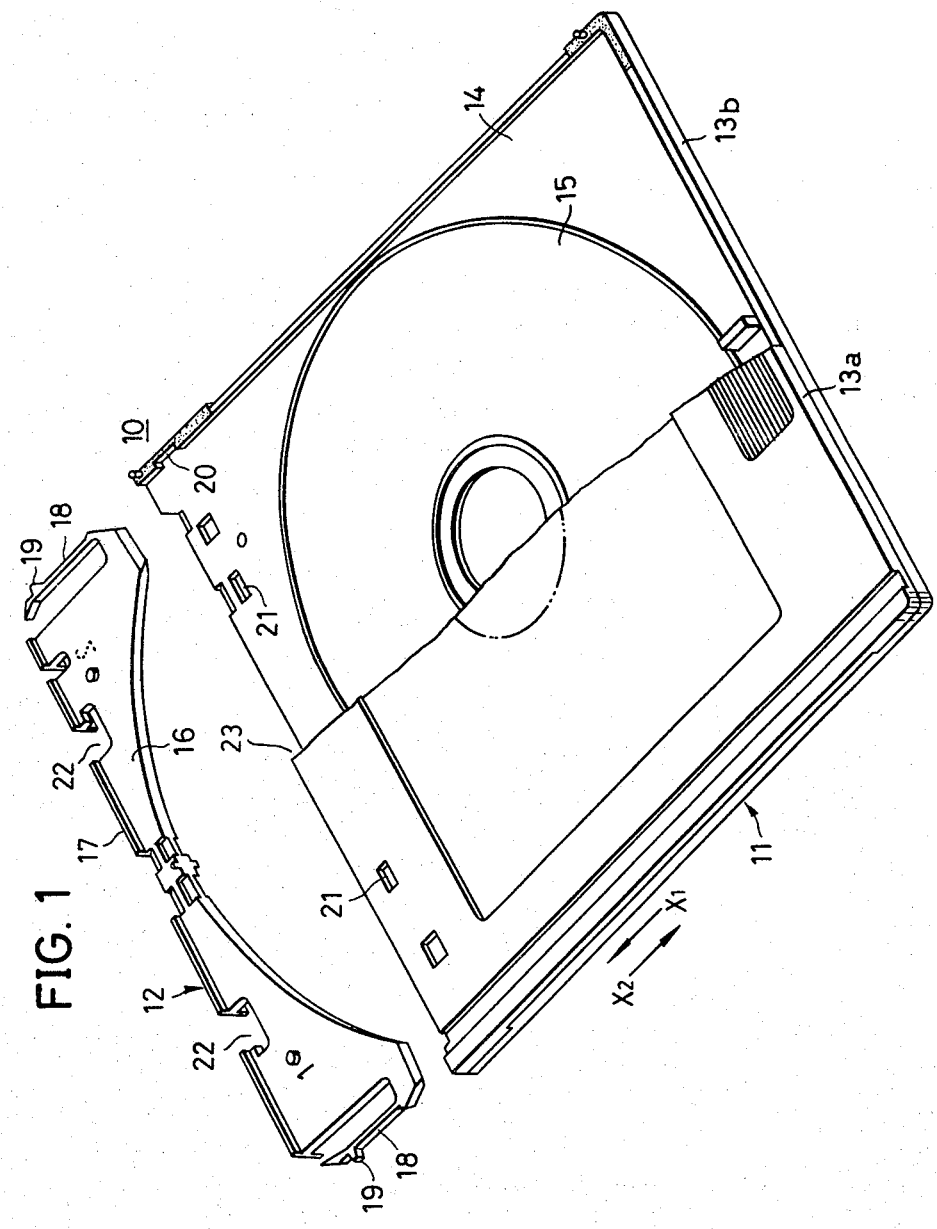
FIG. 1 is a perspective view, with a part cut away and disassembled, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13a and 13b, and comprises a flat cavity or space 14 therein. This space 14 is open at an opening 23 at the front side of the jacket 11, and accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
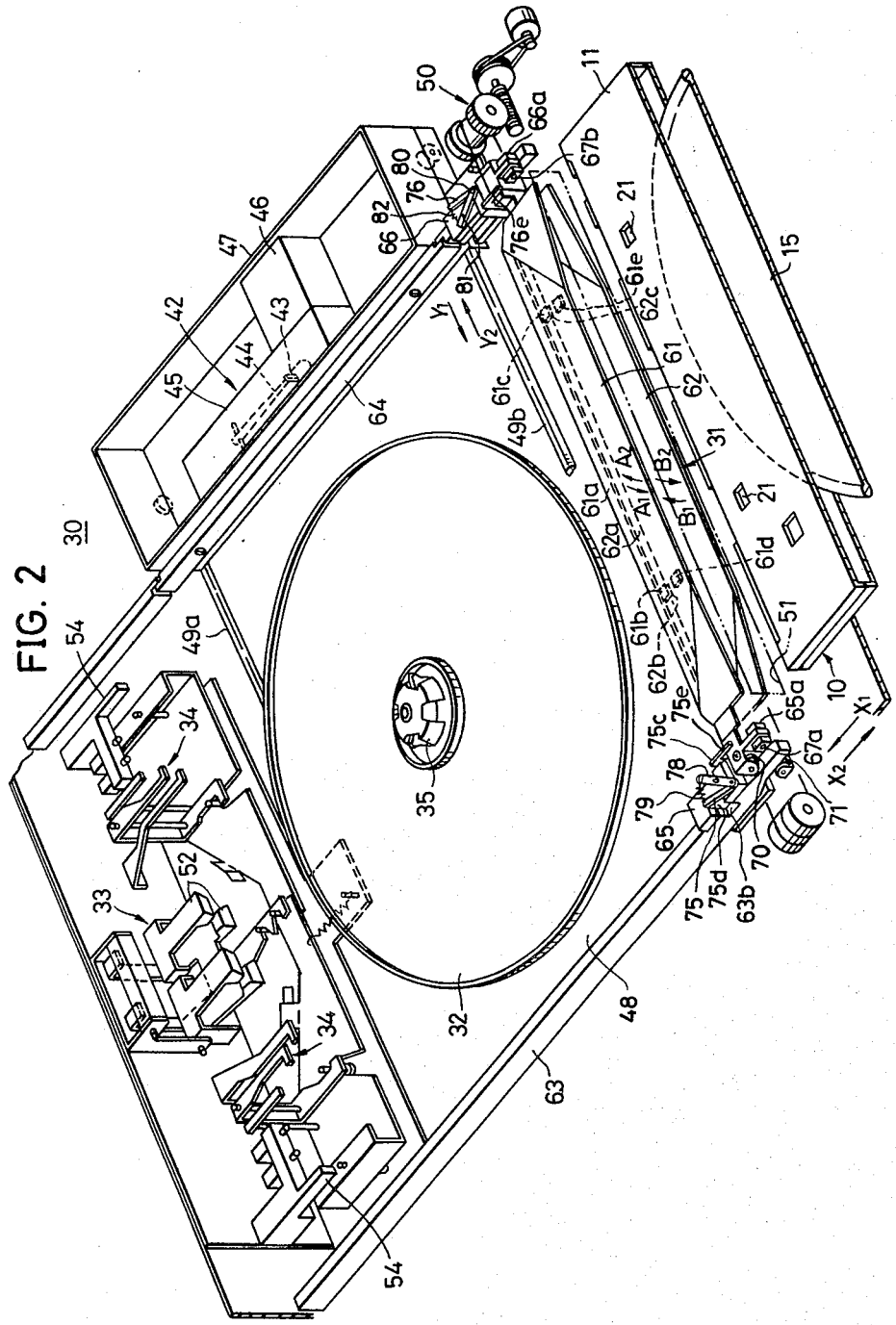
FIG. 2 is a perspective view, with a part cut away, showing the inner construction of an embodiment of a rotary recording medium reproducing apparatus according to the present invention.

As shown in FIG. 2, a reproducing apparatus 30 substantially comprises a jacket opening enlarging device 31 which forms an essential part of the apparatus according to the present invention, a turntable 32 for rotating the disc 15 placed thereon, a disc holding mechanism 33 for holding the disc 15, a lid plate locking mechanism 34 for locking the lid plate 12, and the like. Description will hereinafter be given with respect to the construction and operation of the jacket opening enlarging device 31.

A reproducing transducer 42 comprises a pickup device 45 including a cantilever 44 provided with a reproducing stylus 43 at the tip end thereof, a resonator 46, and the like, and is mounted to a carriage 47. The carriage 47 is transferred in the directions of arrows Y1 and Y2 by means of a transferring mechanism 50, in a state where rollers provided on the carriage 47 roll along rails 49a and 49b respectively provided on a chassis 48.

The disc holding mechanism 33 is provided at the inner part of the reproducing apparatus 30 on the opposite side of an inserting opening 51, and comprises a pair of upper and lower holding fingers 52.

Upon reproduction of the disc 15, the disc case 10 is inserted through the inserting opening 51 of the reproducing apparatus 30, by inserting the disc case 10 with the side of the lid plate 12 into the direction of an arrow X1.

When the disc case 10 is inserted into the reproducing apparatus 30 in the above described state, the jacket opening enlarging device 31 is pushed in the direction of the arrow X1 by the disc case 10. As the jacket opening enlarging device 31 moves, the front part of the upper and lower jacket halves 13a and 13b are enlarged upwards and downwards, to enlarge the opening 23 as will be described hereinafter.

When the disc case 10 is inserted into the innermost part of the reproducing apparatus 30 together with the enlarging device 31 through the upper side of the turntable 32, cutouts 22 of the lid plate 12 is locked by the lid plate locking mechanism 34. Hence, the lid plate 12 is locked and held at the innermost part of the reproducing apparatus 30.

Furthermore, engagement releasing members 54 enter inside the openings on the right and left sides of the disc case 10, and push sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is held at a predetermined height by the holding fingers 52.

Next, the jacket 11 is pulled out in the direction of an arrow X2. Since the lid plate 12 and the disc 15 are respectively locked and held as described above, only the jacket 11 is moved in the direction of the arrow X2, leaving behind the lid plate 12 and the disc 15. Accompanied by this pulling out operation of the jacket 11, the lid plate 12 and the disc 15 are relatively pulled out from within the jacket 11. In a state where the jacket 11 is completely pulled out from the reproducing apparatus 30, the disc 15 is supported horizontally at a position directly above the turntable 32.

Next, when a play operation is performed, the disc 15 is lowered and placed onto the turntable 32, and is clamped by a disc clamping mechanism 35. In addition, the disc 15 is rotated towards a clockwise direction together with the turntable 32.

Moreover, the carriage 47 moves in the direction of the arrow Y1 from a waiting position, to reproduce the information signal by the reproducing stylus 43 which relatively scans the recording surface of the disc 15.

Next, an operation in which the disc 15 is recovered from within the reproducing apparatus 30, will now be described.

Upon completion of the reproducing operation, the disc 15 is pushed upwards. Further, the disc 15 which is pushed upwards, is held by the disc holding mechanism 33.

Upon recovering of the disc 15, an empty jacket 11 is again inserted into the reproducing apparatus 30 through the inserting opening 51, with the opening of the jacket 11 first. Thus, the enlarging device 31 is pushed by the jacket 11 and moves in the direction of the arrow X1, to enlarge the opening of the jacket 11. As the jacket 11 is inserted towards the direction of the arrow X1, the disc 15 is relatively inserted into the jacket 11 through the opening of the jacket 11.

When the jacket 11 is inserted into the innermost position inside the reproducing apparatus 30, the disc 15 becomes completely incased within the jacket 11, and furthermore, the locked lid plate 12 is relatively inserted within the opening of the jacket 11.

When the jacket 11 is inserted into a final position, the disc 15 is accommodated within the jacket 11, and the main part of the lid plate 12 which has been locked, is inserted inside the jacket opening. Further, the lid plate locking mechanism 34 releases the lid plate 12.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, description will be given with respect to an embodiment of a jacket opening enlarging device which forms an essential part of the reproducing apparatus according to the present invention, with reference to FIGS. 3, 4A, 4B, 4C, and 5. In each of these figures, parts which are the same as those corresponding parts in FIGS. 1 and 2 are designated by like reference numerals, and their description will be omitted.

The jacket opening enlarging device 31 is substantially constructed from elongated upper and lower enlarging members 61 and 62 extending in the directions of the arrows Y1 and Y2, and sliders 65 and 66 respectively fitted on guide rails 63 and 64. The sliders 65 and 66 respectively support both ends of the above enlarging members 61 and 62. In accordance with the insertion and extraction of the disc case 10, the above jacket opening enlarging device 31 moves in the directions of the arrow X1 and X2 under the guidance of the guide rails 63 and 64, passing above the turntable 32 between a position in the vicinity of the inserting opening 51 and the innermost part of the reproducing apparatus 30.

The upper enlarging member 61 is axially supported by bearing parts 65a and 66a provided at the upper sides of the sliders 65 and 66, at trunnions 67a and 67b provided at the left and right sides of the upper enlarging member 61. Accordingly, the upper enlarging member 61 is capable of pivotting towards the directions of arrows A1 and A2. On the other hand, the lower enlarging member 62 is also axially supported in a similar manner, to pivot in the directions of arrows B1 and B2. Trunnions 68a and 68b (only one shown) of the lower enlarging member 62 are respectively supported by bearings (not shown) provided on the lower side of the sliders 65 and 66. The trunnions 67a, 67b, 68a, and 68b are respectively disposed in the enlarging members 61 and 62 at the lateral edges, in the direction of the arrow X2. Further, tension coil springs 69a and 69b are respectively stretched between the ends of the upper and lower enlarging members 61 and 62, to urge these enlarging members towards closing directions indicated by the arrows A1 and B1.

Furthermore, a downwardly bent part 61a is formed at the edge on the opposite side from the trunnions 67a and 67b, in the upper enlarging member 61. Two enlarging fingers 61b and 61c are formed by bending this downwardly bent part 61a at two positions. These enlarging fingers 61b and 61c extend towards the inserting opening 51 (in the direction of the arrow X2), at positions confronting the two cutouts 22 of the lid plate 12 of the inserted disc case 10. Similarly, the lower enlarging member 62 is also formed with a bent part 62a and enlarging fingers 62b and 62c. The two sets of enlarging fingers 61b, 61c, 62b, and 62c confront in the upward and downward directions, and mutually cooperate to carry out a jacket opening enlarging operation as will be described hereinafter. Further, the upper enlarging member 61 is formed with lugs 61d and 61e, which are inserted into windows 21 of the upper jacket half 13a of the enlarged jacket 11. The lower enlarging member 62 has no lugs.

In addition, the upper and lower enlarging members 61 and 62 are provided with rollers 70 and 71 (left hand side rollers not shown) for rolling over the guide rails 63 and 64 to separate the enlarging members in the upward and downward directions.

When the jacket opening enlarging device 31 is positioned on the side of the inserting opening 51 as shown in FIG. 2, the rollers 70 and 71 oppose the narrow part of tapered parts 63a on the front sides of the guide rails 63 (64). At this point, the upper enlarging member 61 is rotated in the direction of the arrow A1 due to a force exerted by the tension coil springs 69a, and is in a downwardly inclined state. The lower enlarging member 62 at this point is rotated in the direction of the arrow B1, and is in an upwardly inclined state. Therefore, the bent parts 61a and 62a at the free edges of the upper and lower enlarging members 61 and 62, are pressing against each other, thereby closing the inserting opening 51 as will be understood from FIGS. 2 and 3. Thus, the upper and lower enlarging members 61 and 62 have a function of closing the inserting opening 51, and it becomes unnecessary to provide a gate exclusively for closing the above inserting opening 51. Therefore, the construction of the inserting opening part of the apparatus can be simplified.

Moreover, in the above described state, the enlarging fingers 61b, 61c, 62b, and 62c mutually close upon each other, and are at a height position at the center of the inserting opening 51.

Figure 4C:
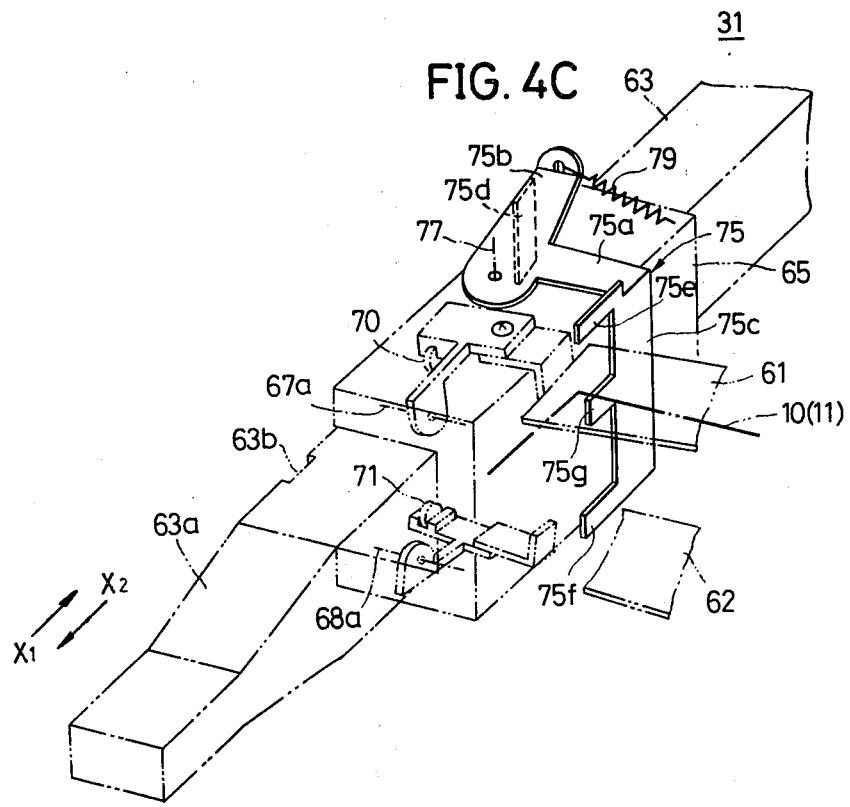

Lock levers 75 and 76 are respectively provided on the sliders 65 and 66. In FIGS. 4A through 4C, the lock lever 75 provided on the left slider 65 is shown. The lock lever 75 is substantially of an L-shape in a plan view, and is axially supported on the upper surface of the slider 65 by a pin 77, at a part in the vicinity of the bent portion of the lock lever 75. An E-shaped part 75c is formed on one arm portion 75a of the lock lever 75, and a bent piece 75d is formed on the other arm portion 75b of the above lock lever 75. The E-shaped part 75c consists of upper and lower fingers 75e and 75f and a center finger 75g. This lock lever 75 is urged to rotate in a clockwise direction by a coil spring 79 which is stretched across between the tip end part of the arm portion 75b and a bracket 78 which is fixedly screwed to the slider 65.

The lock lever 76 is of the same construction as the above described lock lever 75, and those parts of the lock lever 76 which are the same as those corresponding parts of the lock lever 75 are designated by like subscripts. The lock lever 76 is axially supported by a pin 80, and is urged to rotate in a counter clockwise direction by a coil spring 82 which is stretched across between the tip end part of an arm portion 76b and a bracket 81 which is fixedly screwed to the slider 66, similarly as in the case of the lock lever 75.

Figure 5:
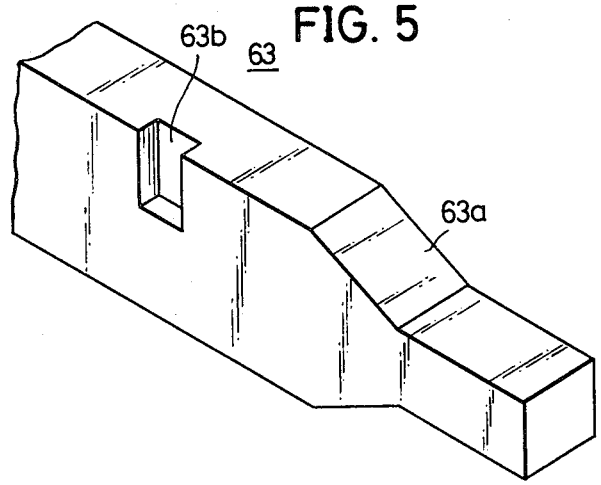
FIG. 5 is a perspective view showing a left side guide rail at a part on the inserting opening side of the reproducing apparatus.

Furthermore, as shown in FIG. 5, a depression 63b is provided at the side of the slider 63, at a part in the vicinity of the tapered part 63a. Similarly, a depression (not shown) corresponding to the above depression 63b is also provided in the slider 64.

Next, description will be given on the operation of the jacket opening enlarging device 31 having the above described construction, especially with respect to the operation of the lock lever 75.

When the jacket opening enlarging device 31 is positioned on the side of the inserting opening 51, the lock lever 75 is at a rotated position shown in FIGS. 2 and 4A. That is, the bent piece 75d is inserted into the depression 63b of the guide rail 63. Accordingly, the movement of the slider 65, that is, the movement of the jacket opening enlarging device 31, towards the direction of the arrow X1 is restricted. The E-shaped part 75c is moved in the direction of the arrow X2, and the upper finger 75e opposes the upper surface of the upper enlarging member 61 while the lower finger 75f opposes the lower surface of the lower enlarging member 62. Further, the center finger 75g enters between the upper and lower enlarging members 61 and 62. The upper and lower fingers 75e and 75f respectively lock the enlarging members 61 and 62, and restrict the rotational movement of the enlarging members 61 and 62 in the directions of the arrows A2 and B2 (enlarging directions). The bent piece (not shown) of the right slider 76 restricts the movement of the slider 66 in the direction of the arrow X2. Moreover, upper and lower fingers 76e and 76f respectively lock the enlarging members 61 and 62, and restrict the rotational movement of the enlarging members 61 and 62 in the enlarging directions.

In addition, the center fingers 75g and 76g respectively are at positions corresponding to the left and right ends of the front surface facing the inserting direction of the disc case 10 (jacket 11) which is inserted into the reproducing apparatus 30 through the inserting opening 51.

Accordingly, when the jacket opening enlarging device 31 is returned towards the direction of the arrow X2, that is, in a disc reproducing mode or a mode in which the disc is not loaded, the upper and lower enlarging members 61 and 62 which are in closed states, are respectively locked. Hence, the upper and lower enlarging members 61 and 62 are restricted of the rotation towards the enlarging directions. Thus, even when the operator inserts a finger and the like through the inserting opening 51, the upper and lower enlarging members 61 and 62 are not rotated towards the enlarging directions, and the insertion of the finger and the like into the reproducing apparatus 30 is positively prevented. Therefore, accidents are prevented in which the finger tip is injured upon contact with the turntable 32 and the like which is rotating at a high speed. Furthermore, the upper and lower enlarging members 61 and 62 are both restricted of the movement in the enlarging directions at the right and left end sides, and unnecessary rotation towards the enlarging directions are positively prevented.

In addition, the jacket opening enlarging device 31 is locked in the vicinity of the inserting opening 51 of the reproducing apparatus 30. Hence, the jacket opening enlarging device 31 is prevented from moving towards the innermost part of the reproducing apparatus 30, due to shock and the like, when transporting the reproducing apparatus 30.

Upon reproduction of the disc 15, the disc case 10 (jacket 11) is inserted from the side of the opening 23 first, through the inserting opening 51, as indicated by a thick two-dot chain line in FIG. 4B. The left and right sides of the jacket 11 accordingly push the center fingers 75g and 76g of the lock levers 75 and 76. Thus, the lock levers 75 and 76 are respectively rotated towards a counter clockwise direction and a clockwise direction.

When the lock lever 75 rotates towards the counter clockwise direction, the state shown in FIG. 4B is obtained. That is, the bent piece 75d separates from the depression 63b, and the slider 65 is in a state possible to move in the direction of the arrow X1. Moreover, with respect to the E-shaped part 75c, the upper and lower fingers 75e and 75f respectively move from positions opposing parts in the vicinity of the left ends of the enlarging members 61 and 62. Accordingly, the upper and lower enlarging members 61 and 62 are in states possible to rotate towards the enlarging directions (towards the directions of the arrows A2 and B2) against the force exerted by the spring 69a. The right lock lever 76 rotates towards the clockwise direction, and the locking with respect to the slider 66 and the locking with respect to the upper and lower enlarging members 61 and 62 are respectively released.

As the disc case 10 (jacket 11) is further inserted into the reproducing apparatus 30, the jacket opening enlarging device 31 moves towards the direction of the arrow X1 as shown in FIG. 4C. Hence, the rollers 70 and 71 respectively ride over the tapered parts 63a to reach the upper and lower surfaces of the guide rail 63. Moreover, the upper and lower enlarging members 61 and 62 respectively rotate towards the directions of the arrows A2 and B2. At this point, the enlarging finger 61b (61c) locks the upper jacket half 13a to pull this upper jacket half 13a in the upward direction. On the other hand, the enlarging finger 62b (62c) locks the lower jacket half 13b to pull this lower jacket half 13b in the downward direction. Therefore, the opening 23 is enlarged in the upward and downward directions.

The disc case 10 is inserted towards the direction of the arrow X1 in the above described enlarged state, and further, only the jacket 11 is pulled towards the direction of the arrow X2. In a state where the opening of the jacket 11 is enlarged, the window 21 of the upper jacket half 13a are inserted with the lug 61d (61e) of the upper enlarging member 61. Hence, when the disc case 10 is pulled out from the reproducing apparatus 30, the jacket opening enlarging device 31 is pulled back towards the direction of the arrow X2 together with the jacket 11, in a state where the windows 21 are engaged with the lug 61d (61e) of the upper enlarging member 61.

In the above described embodiment of the invention, the upper and lower fingers 75e and 75f (76e and 76f) which lock the upper and lower enlarging members 61 and 62, and the center finger 75g (76g) which detects the insertion of the jacket 11, are provided on one member, that is, on the lock lever 75 (76). Accordingly, the number of parts is reduced, and the operation can be performed positively.

In addition, the center fingers 75g and 76g are provided at positions so that these fingers 75g and 76g are respectively pushed by the left and right ends of the front surface facing the inserting direction of the disc case 10, as described above. Hence, the center fingers 75g and 76g are also positively pushed when the jacket 11 is inserted. Moreover, since these center fingers 75g and 76g are provided on the left and right ends of the inserting opening 51 of the reproducing apparatus 30, even when the operator inserts a finger into the inserting opening 51, it is unlikely that the center fingers 75g and 76g will be pushed.

In the above described embodiment of the invention, lock levers are respectively provided on the left hand side and the right hand side of the jacket opening enlarging device 31. Hence, unless the fingers 75e and 76f are pushed simultaneously, the locking with respect to the upper and lower enlarging members 61 and 62 are not released. Therefore, the upper and lower enlarging members 61 and 62 are prevented from being unnecessarily put into states possible to rotate towards the enlarging directions.

Further, this invention is not limited to these embodiments but various variations and modifications may be made without departing from the scope of the invention.

What is claimed is:

1. A rotary recording medium reproducing apparatus for reproducing a rotary recording medium accommodated within a case, said case having a jacket with a space for accommodating said rotary recording medium and an opening through which said rotary recording medium can enter and leave said jacket, and a lid member inserted through said opening of said jacket for closing said opening, said reproducing apparatus comprising:

- a front side of said apparatus having a laterally elongated inserting opening through which said case may be inserted;
- holding means at a rear part of said reproducing apparatus, for holding said rotary recording medium within said reproducing apparatus when an operation is performed in which said case is inserted into said reproducing apparatus and then said jacket is pulled from said reproducing apparatus for loading said recording medium in said reproducing apparatus;
- turntable means for rotating said rotary recording medium loaded within said rotary recording medium reproducing apparatus; and
- jacket opening enlarging means coupling with the jacket and movable over said turntable means between a vicinity of said inserting opening and the rear part of said reproducing apparatus, said enlarging means coordinating with the insertion and extraction of said case having the jacket,
- said jacket opening enlarging means comprising upper and lower enlarging members aligned horizontally with said inserting opening in said vicinity of said opening and being pivotally coupled together to enable them to swing up and down to open and close, respectively, and said upper and lower enlarging members respectively having finger means projecting toward said inserting opening, said finger means together with said enlarging members being close to each other when said jacket opening enlarging means is in the vicinity of said inserting opening; rotating means for swingably opening said upper and lower enlarging members so that said finger means respectively separate from each other as said jacket opening enlarging means moves away from the vicinity of said inserting opening to the rear part of said reproducing apparatus, so that said finger means enlarge said opening as said upper and lower enlarging members swing upwardly and downwardly; and
- an enlarging member locking mechanism interlocking said upper and lower enlarging members for keeping the enlarging members closed together to close said inserting opening when said jacket opening enlarging means is positioned in the vicinity of said inserting opening, and release the interlock upon insertion of said case.

2. A rotary recording medium reproducing apparatus as claimed in claim 1 in which said enlarging member locking mechanism has upper locking fingers opposing the upper side of said upper enlarging member and lower locking fingers opposing the lower side of said lower enlarging member, when said jacket opening enlarging means is positioned in the vicinity of said inserting opening, and case insertion detecting fingers provided at positions so as to be pushed by said case inserted through said inserting opening, for moving said upper and lower locking fingers to positions separated from said upper and lower enlarging members by being pushed by said case.

3. A rotary recording medium reproducing apparatus as claimed in claim 2 in which said case insertion detecting fingers are arranged and provided at positions so that said case insertion detecting fingers are pushed by at least one end part of right and left end parts of the front surface facing the inserting direction of said case inserted through said inserting opening.

4. A rotary recording medium reproducing apparatus as claimed in claim 2 in which said upper and lower locking fingers and said case insertion detecting fingers are unitarily formed on lock levers which are respectively axially supported on a part of said jacket opening enlarging means.

5. A rotary recording medium reproducing apparatus as claimed in claim 1 in which said enlarging member locking mechanism consists of a left end side enlarging member locking mechanism arranged and provided to act on the left end side of said upper and lower enlarging members, and a right end side enlarging member locking mechanism arranged and provided to act on the right end side of said upper and lower enlarging members.

6. A rotary recording medium reproducing apparatus as claimed in claim 5 in which said left end side enlarging member locking mechanism has a case insertion detecting finger at a position where said case insertion detecting finger is pushed by a left end part of a front surface of said case facing the rear part when the case is inserted through said inserting opening, and said right end side enlarging member locking mechanism has another case insertion detecting finger at a position where said other case insertion detecting finger is pushed by a right end part of the front surface of said case facing the rear part when said case is inserted through said inserting opening.

7. A rotary recording medium reproducing apparatus as claimed in claim 1 in which said jacket opening enlarging means further has a movement locking mechanism for locking said jacket opening enlarging means in the vicinity of said inserting opening unless said case is inserted through said inserting opening.

8. A rotary recording medium reproducing apparatus as claimed in claim 7 in which said movement locking mechanism comprises depressions formed respectively in guide rails for guiding the movement of said jacket opening enlarging means in the vicinity of said inserting opening, and inserting pieces which are respectively inserted within said depressions before insertion of said case into said reproducing apparatus and respectively slip out from said depressions by the insertion of said case.

* * * * *